Dec. 22, 1953   H. HENDRICKSON   2,663,562
TRUCK SCALE
Filed Nov. 28, 1951
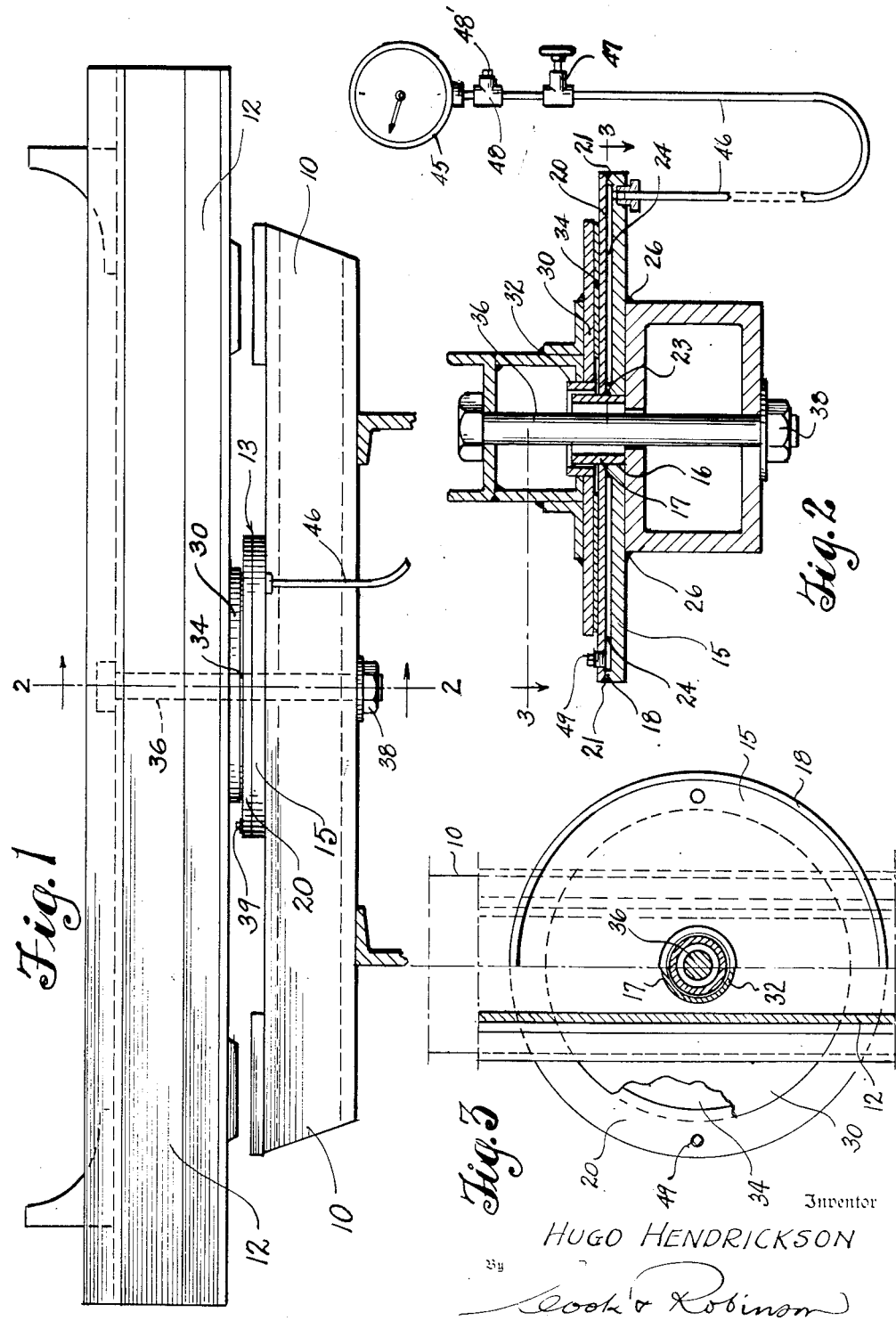
Inventor
HUGO HENDRICKSON
By
Cook & Robinson
Attorney Patented Dec. 22, 1953

2,663,562

UNITED STATES PATENT OFFICE 2,663,562

TRUCK SCALE

Hugo Hendrickson, Port Angeles, Wash.

Application November 28, 1951, Serial No. 258,567

1 Claim. (Cl. 265—40)

This invention relates to weight indicating scales as designed for use on trucks, trailers and similar kinds of load hauling vehicles, to indicate the approximate weight of a load being supported thereby.

For a better understanding of the objects and uses of the present invention, it will here be explained that many States have laws or regulations that limit the weight of the load that can be legally carried on highway vehicles of various kinds; such laws being particularly applicable to trucks and trailers of the freight hauling types and generally concerns the number of pounds per square inch that can be applied through the vehicle wheels to the road surface. Many States have set the load limit at 500 pounds per square inch for trucks and trailers operating on concrete highways, and scales have been installed at locations on the principal highways where weight of vehicles is checked to determine if there is any violation of regulations.

Operators are generally desirous of hauling maximum loads, and it frequently happens they inadvertently overload. This is primarily due to the fact that weighing facilities are not readily available at the places of loading. In the logging industry, particularly, where it has become a general practise to transport large and heavy loads of logs from forest to mill by means of truck and trailer combinations, it is very difficult for the vehicle operator or the loader to estimate the weight of logs, and it is not the practise, nor is it practical to provide weighing facilities at the logging areas.

In view of the above explanatory matter, it has been the principal object of this invention to provide a practical, relatively inexpensive and substantially accurate weight indicator or scale, that can be readily installed in the common load hauling vehicles of the truck and trailer types, to indicate to a satisfactory degree of accuracy, the weight of the load being carried thereon, thus to enable the operator to ascertain the pounds per square inch being sustained by the roadway through the vehicle wheels or tires, and to avoid overloading.

More specifically stated, it is the object of the present invention to provide and to install a load weighing scale between a load support, which may be on, or a part of wheel truck, and a load supporting cross-bunk, whereby the weight of the load applied through the support and sustained by the truck wheels will be indicated to the vehicle operator.

It is a further object of the present invention to provide a scale of the above stated character which is in the form of a hollow compressible wafer containing a hydraulic pressure medium, suitable for disposition between the support and bunk so as to sustain the weight of load thereon; the hydraulic chamber of the wafer being connected by a pipe line to a pressure gauge which will operate under influence of weight as applied to the wafer and hydraulic medium therein, to designate the weight of load being sustained.

Further objects of the invention reside in the details of construction of the scale; in its application to the vehicle, and to its mode of operation, as will hereinafter be fully described.

In accomplishing these and other objects of the invention, I have provided the improved details of construction, the preferred forms of which are illustrated in the accompanying drawings, wherein—

Fig. 1 shows in elevation, a cross-bunk of a log-hauling truck as supported upon a weighing device embodied by the present invention.

Fig. 2 is a cross-section taken on the line 2—2 in Fig. 1, and diagrammatically showing the pipe line between the hydraulic wafer and pressure gauge.

Fig. 3 is a horizontal section, taken substantially on line 3—3 in Fig. 1.

Referring more in detail to the drawings—

In Fig. 1, 10 designates what may be a load supporting member as associated with a truck or trailer chassis or with a wheel mounting truck of a load hauling vehicle and 12 designates a cross-beam or bunk that is supported thereon for the sustaining of a load. It is generally the case, in a truck, trailer or rail car, that the member 10 is located directly over a set of load carrying wheels so that the load, as sustained thereby, will be distributed equally to the wheels regardless of the number used.

The cross-bunk 12 is here shown to be supported directly above and upon the base member 10 through the mediacy of an interposed hydraulic wafer which comprises a principal part of the present weighing means.

As best observed in Fig. 1, the hydraulic wafer which is designated in its entirety by reference numeral 13, is located at a point midway of the ends of the parts 10 and 12 and it comprises a circular bottom plate 15 of metal, preferably a steel plate of sufficient thickness to resist any flexing under the weight required to be sustained thereby. It is disposed upon and is fixedly secured in horizontal position by any suitable means, to the cross-support 10 which, in Fig. 2, is shown to be a hollow beam. At its center, the plate 15 is formed with a circular hole 16 in which the lower end portion of a short tubular guide 17 is fixed; the tube being vertically disposed and concentric of the disk. About its periphery, the disk or plate 15 has an upstanding rim flange 18 upon which a flat disk or plate 20 is disposed. The disk or plate 20 is of the same diameter as plate 15 and is supported on the rim flange 18 in spaced relationship thereto, and it is welded about its outer edge, as at 21 to the disk 15 in a leak proof and pressure tight joint.

At its center the disk 20 has a hole through which the tube 17 extends, and it is welded to the tube and to disk 15 in a pressure tight joint as at 23. By this mode of assembly of parts, a shallow chamber as at 24 in Fig. 2, is provided between the plates 15 and 20. This chamber is hereinafter referred to as the pressure chamber.

The wafer 13 is disposed flatly and centered upon the cross support 10, as shown in Figs. 1 and 2, and is then welded as at 26 in Fig. 2, or otherwise fixedly secured thereto. Resting upon the top plate 20 of the wafer, is a circular capping plate 30, provided at its center with a circular opening in which the lower end of a tubular guide 32 is fixed. The tube 32 is rotatably and slidably fitted about the upper end portion of the tube 17. Between the top plate of the wafer and capping plate 30, is a thin wear plate 34 that may be replaced when necessary. The cross-bunk 12 is disposed upon a diametrically across the capping plate 30 and it is welded or otherwise secured thereto, as shown in Fig. 2. A pivot bolt 36 extends down through the bunk and central openings in the capping plate, wear plate and wafer, and then through the base member 10 and is secured by a nut 38 at its lower end.

It is of importance to successful operation of the present device that the top plate 20 of the wafer be of a somewhat flexible nature, that is, it must be resilient to the extent that under a load sustained thereon, it can be downwardly deflected between its lines of peripheral support at inner and outer welds 21 and 26. Also, that the load thereon be applied through the mediacy of the wear plate 34 and that this plate be of an annular form, concentric of the wafer and resting upon the plate 20 between the lines of its support. The top plate 30 is of heavy, rigid material so that the weight of the load will be evenly applied to the wear plate.

As an indication of a practical size and dimensions or thickness of plates, it will here be mentioned, that in a scale that has been provided for use on a logging trailer truck, the wafer has a diameter of about 20 inches. The plate 15 is of steel and 5/8 inch thick. The top plate of the wafer is 1/2 inch thick. The load sustaining plate 30 is about 18 inches in diameter and 1/2 inch thick. The spacing between plates 15 and 20, to provide the pressure chamber 24 for the hydraulic medium is .02 inch deep. The plate 20 is of a resilient material that will flex under load as required to be sustained, but not beyond its elastic limit.

To give a visual indication of the weight of load carried or sustained by the wafer 13, I employ a pressure gauge of standard type, as designated in Fig. 2 by numeral 45. This has a pressure pipe connection 46 with the pressure chamber 24 of the wafer as seen in Fig. 2. This pressure line may include therein a cut-out valve 47, and a fitting 48 with removable plug 48' for filling the system with a hydraulic medium. Preferably the gauge would be located in a place easily seen by the vehicle operator from the driver's seat.

To set the device for use, the pressure chamber 24 and pipe line 46 are first filled with a hydraulic medium to the exclusion of all air, which may be bled from the system through a hole in the top plate of the wafer. This hole is normally closed by a plug 49, best shown in Fig. 2. After the system has been filled with the hydraulic medium, the hand of the pressure gauge would be set at that indication which shows weight of the unloaded bunk. The gauge dial also would be graduated by placing loads of known weight on the bunk to establish the location of scale markings, and particularly to show the maximum load.

It will be understood that with the system thus installed, and the gauge dial properly graduated, the vehicle operator can, for example, go into the forest and load the truck until the maximum load has been indicated on the dial. He can then proceed on the highway with safety.

Not only is the present scale useful as a means to avoid loading above the legal limit as established by highway or state regulations, but also is a means of preventing overloading the truck and causing damage thereto.

There are various ways in which devices of this character may be made, and installed. However, the parts as shown are now believed to be the most practical for the mode of application herein illustrated, but is not the intent that the manner of mounting the wafer be in any way restricted.

In the claims which terminate this specification, I will for sake of expediency, designate the cross-beam 10 as the "base member" with the understanding this term shall have reference not only to the beam 10 as shown, but to any form of base support through which the weight of a load carried on the bunk 12, and transmitted to the base member through the mediacy of the wafer B, will be sustained and distributed to the vehicle wheels which are directly associated with the base member. The term "load carrying beam" shall have reference to the beam 15 or any similar load sustaining member that can be mounted on the wafer. The term "pressure gauge" will have reference to the gauge as shown, or any similar form of load indicator.

I claim:

In a load hauling vehicle of the truck or trailer type; a wheel truck including a load carrying base member and a load supporting cross-bunk arranged for support on the base member, and a load weight indicator comprising a hydraulic wafer interposed between the said base member and cross-bunk, a pressure gauge and a pipe line connecting the pressure gauge and the chamber of the hydraulic wafer; said wafer comprising a flat, rigid, bottom plate, disposed flatly upon the base member, a top plate of flexible metal joined with the bottom plate about its outer periphery and spaced therefrom to provide an intermediate chamber containing a hydraulic pressure medium, a wear plate disposed on the top plate of the wafer and a capping plate disposed on the wear plate and supporting the cross-bunk thereon, said base member, cross-bunk, wafer, wear plate and capping plate having aligned openings therethrough and a pivot bolt extending through said openings and joining the base member and bunk.

HUGO HENDRICKSON.

References Cited in the file of this patent

UNITED STATES PATENTS

| Number | Name | Date |
|---|---|---|
| 2,365,589 | Poston et al. | Dec. 19, 1944 |
| 2,592,501 | Williams | Apr. 8, 1952 |

FOREIGN PATENTS

| Number | Country | Date |
|---|---|---|
| 195,793 | Great Britain | Apr. 12, 1922 |
| 398,687 | Great Britain | Sept. 21, 1933 |